R. F. STIEPER.
COMBINED PLANTER AND FENDER FOR CULTIVATORS.
APPLICATION FILED MAR. 3, 1919.
1,379,842.  Patented May 31, 1921.
2 SHEETS—SHEET 1.
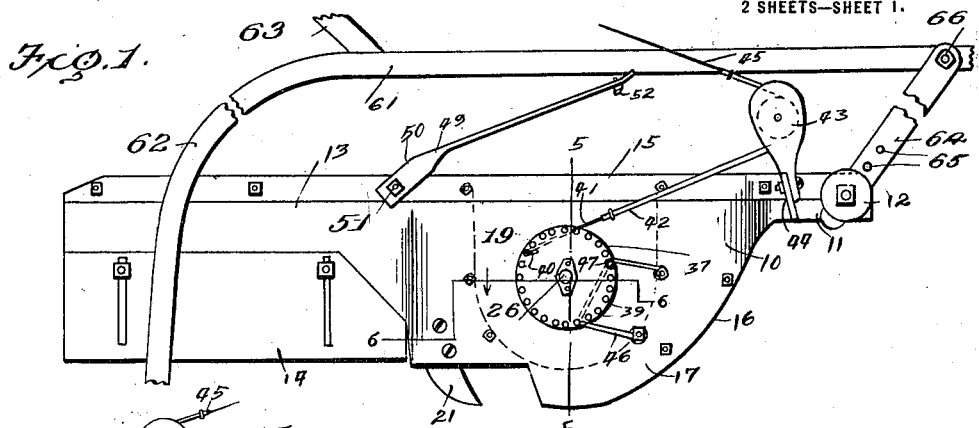
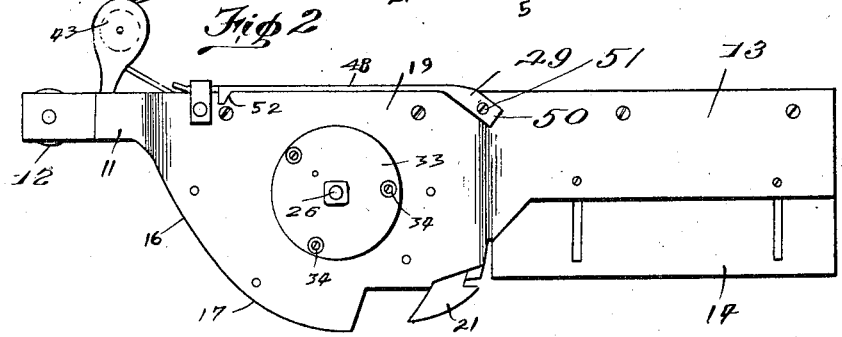
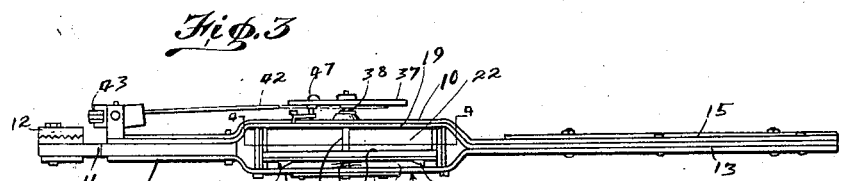
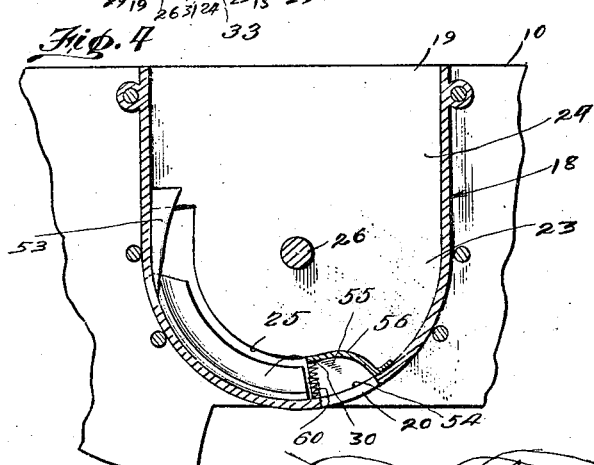
Witness
F. G. Stevens
E. Dennison
Inventor
R. F. Stieper
By [signature]
Attorneys

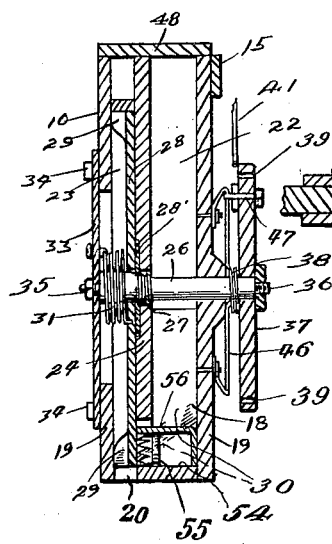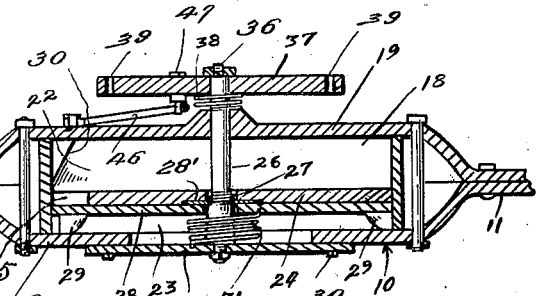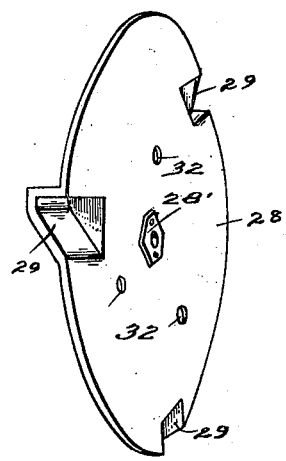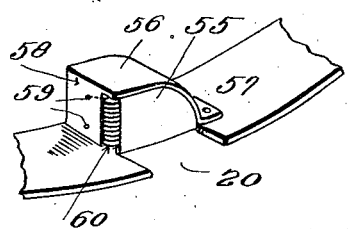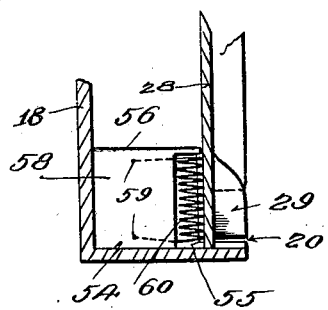

UNITED STATES PATENT OFFICE.

RICHARD F. STIEPER, OF WEST SIDE, IOWA.

COMBINED PLANTER AND FENDER FOR CULTIVATORS.

1,379,842.  Specification of Letters Patent.  Patented May 31, 1921.

Application filed March 3, 1919. Serial No. 280,407.

*To all whom it may concern:*

Be it known that I, RICHARD F. STIEPER, a citizen of the United States, residing at West Side, in the county of Crawford, State of Iowa, have invented certain new and useful Improvements in Combined Planters and Fenders for Cultivators; and I do hereby declare the following to be a full, clear, and exact description of the invention, such as will enable others skilled in the art to which it appertains to make and use the same.

This invention is an improvement in agricultural machines and has particular reference to a planter attachment for cultivators.

An object of the invention is to provide a corn planter of improved construction adapted primarily for attachment to a cultivator and employed to intermittently drop seed when cultivating, about one week after the first plants appear, at which time the device is used as a replanter to complete the rows where plants are missing.

Another object is to provide an improved seed feeding or discharging mechanism which may be controlled by the operator of the machine to drop seed at any desired point.

A further object is the provision of a planter of this character which is simple in construction, easy to manufacture, readily applicable to cultivators of known construction and effective in carrying out the purposes for which it is designed.

The inventive idea involved is capable of receiving a variety of mechanical expressions one of which, for the purpose of illustrating the invention, is shown in the accompanying drawings wherein:

Figure 1 is a side elevation of the combined planter and fender constructed in accordance with the invention.

Fig. 2 is a similar view looking at the opposite side thereof.

Fig. 3 is a top plan view, with the cover of the hopper in an open position.

Fig. 4 is a longitudinal section on the line 4—4 of Fig. 3.

Fig. 5 is a transverse section on the line 5—5 of Fig. 1.

Fig. 6 is a section on the line 6—6 of Fig. 1.

Fig. 7 is a perspective view of the seed outlet.

Fig. 8 is a perspective view of the seed disk, and

Fig. 9 is a transverse sectional elevation thereof.

The invention is so constructed that the same may be applied to cultivators of known construction and is shown in the accompanying drawings in what is now believed to be its preferred form which comprises a planter body 10 at the forward end of the attachment having an extension 11 at its upper portion to which is secured a clamp 12 utilized for the purpose of attaching the device to a cultivator in the usual manner. The rear portion of the device provides a fender 13 to which is secured for vertical adjustment the vertical shield 14 which prevents the dirt being thrown by the cultivator on to the rows of plants. A reinforcing plate 15 is extended along and secured to the upper edge of the device and the forward end of the body of the planter is rounded or curved as indicated at 16 to form a furrow opener 17 at its lower end and behind which the seed is dropped in a manner which will appear in the course of the description. The planter body is provided with a hopper formed by a pair of spaced plates 19 connected by a U-shaped wall 18″, provided in the bottom thereof with a seed outlet opening 20 arranged at a point slightly in rear of the middle of said hopper, and disposed rearwardly of said opening 20 is a shoe or furrow covering element 21 designed to cover the furrow after seed has been dropped thereinto.

The hopper 18 is preferably divided into seed containing and disk receiving compartments 22 and 23, respectively, by means of a vertically disposed partition 24 supported in the hopper in any suitable manner and having its lower portion cut away on a curved line to form a seed passage as indicated at 25. Extending centrally through the hopper for rotation and lateral movement therein is a shaft 26 the intermediate portion of which is screw threaded as indicated at 27 to receive thereon a seed disk 28 through the medium of a nut 28′ riveted thereto, said disk being rotatable within the compartment 23 of the hopper 18. The disk is provided at its periphery at regularly spaced intervals with seed cells 29 offset laterally from its body and opening both radially and axially from the disk. As the latter rotates, the cells move alongside the partition 24 so as to receive seed from the compartment 22, said seed being directed through the passage 25 and into the cells by means of a deflecting plate 30 arranged in the seed compartment opposite said passage and disposed in a diagonal plane with respect to the partition 24 and having its rear end cut off straight. It is to be understood that only one of the cells 29 is employed at a time and these cells are made in different sizes so as to contain various quantities of seed for deposit into the ground.

The seed disk is yieldably held in a normal or inoperative position with the cell 29 thereof from which the seed is adapted to be discharged located at a remote point from the outlet opening 20 in the bottom of the hopper, and to maintain said disk in this position there is preferably provided a coil spring 31 one end of which is adapted to engage in the opening 32 adjacent the cell 29 from which seed is adapted to be discharged while the other end of said spring is mounted in a removable closure plate 33 secured to the side 19 of the hopper which forms one of the walls of the compartment 23. By removing the bolt or screw fasteners 34 of the plate 33 it will be apparent that access to the compartment 23 may be had in order to adjust the inner end of the spring into any one of the openings 32 by rotating the disk 28 to register said opening therein with the end of the spring. From this construction it will be apparent that the spring 31 will be coiled about the shaft 26 and interposed between the disk 28 and plate 33 and the spring is normally tensioned so as to maintain the disk in its inoperative position and return the same to such position after the seed has been discharged from the cell 29. The closure plate 33 is mounted upon the screw threaded end 35 of the shaft 26 and by so disposing the spring 31 as above described it will also be obvious that the same will exert an inward pressure upon the disk 28 and thus have a tendency to hold the same in engagement with the partition 24. The opposite end of the shaft 26 projects through the adjacent side of the hopper and is also screw threaded as indicated at 36 to receive thereon a regulating disk or plate 37 between which and the adjacent side 19 of the hopper is interposed an expansible spring 38 coiled about the end of the shaft 26 and exerting an outward pressure upon the plate 37 so as to have a tendency to move the shaft transversely or laterally with respect to the hopper and thus, in conjunction with the spring 31, also cause the disk 28 to be maintained in engagement with the partition 24 or to give in the opposite direction to prevent obstruction of the cells. This plate 37 is adapted to be rotated in order to turn the disk 28 to its operative or discharging position and, to this end, said plate 37 is provided adjacent its periphery with a plurality of openings 39 to any one of which is adapted to be connected the hook 40 formed upon one end of a rod 41. From this rod a flexible element or round leather belt 42 extends around a small pulley 43 secured to an extension 44 formed upon the forward end of the reinforcing bar 15, and connected to the belt 42 is a second flexible element or wire 45 leading to a point adjacent the operator's seat, so that a pull upon said wire will rotate the plate 37 and the seed disk 28. In order that the rotation of the seed disk will be controlled so that the proper cell 29 will be brought into registration with the seed outlet opening in the bottom of the hopper there is provided a stop device designed to limit the rotation of the plate 37 and disk 28 to both the operative and inoperative positions. This stop device preferably is formed from a single length of wire 46 bent into substantially U-shaped formation and having its legs secured to the side 19 of the hopper adjacent the plate 37 while its intermediate portion is arranged between said side and plate. Engageable in one of the openings 39 is a screw or pin 47 which, when the parts are in normal position, engages one leg of the stop device and which, when the plate 37 is rotated, will engage in the other leg of said stop device and prevent further rotation of the parts. Should it be desired to adjust the seed disk 28 so that the seed will be discharged from a different cell 29, the end of the spring 31 in engagement with said disk is disconnected therefrom, the pin or screw 47 removed from the opening 39 and the hook 40 disconnected from the opening in which it is engaged. The shaft 26 may then be rotated carrying the disk 28 and plate 37 therewith until the former is adjusted to the desired position, after which the end of the spring 31 may be engaged with the opening 32 adjacent the desired cell and the hook 40 again engaged with one of the openings 39 and the pin 47 also mounted in one of the said openings in such position that it will engage the stop device as shown in Fig. 1.

The hopper 18 is preferably provided with a cover 48 having a bifurcation 49 at one end to provide the pivot ears 50 connected to the hopper by a pivot 51 in such manner that the cover may be adjusted vertically to its closed and opened positions. The free end of the cover is provided with the spring clips 52 engageable with the sides 19 of the hopper in such manner as to yieldably maintain the cover in closed position and it will be apparent that by raising said cover access may be had to the interior of the hopper to deposit seed into the compartment 22.

As previously stated, the deflecting plate 30 is arranged at the bottom of the hopper and disposed in a diagonal or inclined plane with respect to the partition 24 so as to direct the seeds through the passage 25 from the seed compartment to the disk compartment. The front wall of the hopper has a guide 53 for the disk disposed at the forward end of the passage 25 as seen in Fig. 4, and the bottom of the hopper wall has through it the seed outlet 20 opening only from the disk compartment, that portion of the bottom opposite this opening being closed at 54 beneath the seed compartment. Said opening 20 is formed by making cuts in the material of the wall and bending up the metal between the cuts into a leaf 55 which stands in line with the partition 24, and co-acting with this leaf is a metal cap 56 whose rear edge is riveted to the hopper wall at 57 and whose forward edge is turned down in a front wall 58, so that collectively these elements make up a block which closes the rear end of the passage 25. The front wall 58 and the leaf 55 do not meet at the corner of the block, and in the space between them is disposed a coiled spring 60, the ends thereof being carried along the inner face of the wall 58 and attached to it at 59 as seen in Figs. 7 and 9. This spring serves as a wiper, and removes all surplus seed from the cell as the latter moves back to its rearmost position where its axially open side is closed by the leaf 55, and at this time its radially open side registers with the outlet 20 and the charge of seed within the cell is dropped therethrough. In other words, the seed cells fill from the side and empty from the bottom, thereby efficiently carrying out the object of the invention and insuring the planting of the proper number of seeds.

As was also previously stated, the device is primarily adapted for use when cultivating for the first time after the appearance of the plants, so that the stand of the corn can be determined. There is, however, no restriction as to the use of the device as it is thought will be understood. The device can also be applied to wheeled cultivators as well as walking cultivators, and in Fig. 1 the application of the device is shown, in which the cultivator beam is indicated at 61 having the shank 62 carrying the usual cultivator plow. Any number of these beams may be employed, while the operating handle or handles extend upwardly therefrom as indicated at 63. The device is connected to the front portion of the beam 61 by an arm 64 leading to the clamp 12, which arm is provided with apertures 65 to permit longitudinal adjustment in addition to the angular adjustment provided through the medium of the clamp 12. There is also provided a clamp 66 connecting the arm to the beam 61 for allowing further angular adjustment of the device by adjustment of the arm relative to the beam. The pull wire or cord 45 is extended upwardly to the gripping portion of the handle 63, to which gripping portion connection is made by means of a suitable pivoted grip or the like, in order that intermittent pull may be exerted upon the pull wire or flexible connection for operating the device to discharge the seeds at the required places. In this manner, the device is entirely under control and a proper stand of corn will be insured.

What is claimed is:—

1. In a seed dispensing mechanism, the combination with a hopper made up of side plates and a U-shaped wall between them, said wall having a seed outlet in its bottom; of a disk pivotally mounted within said hopper and having cells opening axially and radially, a block fixed in the hopper alongside the outlet and closing the lateral opening of a cell when the same stands opposite to the block with its radial opening registering with said outlet, and means for moving the disk as described.

2. In a seed dispensing mechanism, the combination with a hopper made up of side plates and a U-shaped wall between them, said wall having a seed outlet in its bottom; of a disk pivotally mounted within said hopper and having cells opening axially and radially, a block fixed in the hopper alongside the outlet and closing the lateral opening of a cell when the same stands opposite to the block with its radial opening registering with said outlet, yielding means normally turning the disk to hold its cells out of registry with said outlet, and manually operable means for turning the disk to cause registration of a cell with the outlet for dropping a charge of seed when desired.

3. In a seed dispensing mechanism, the combination with a hopper made up of side plates and a U-shaped wall between them, said wall having a seed outlet in its bottom; of a disk pivotally mounted within said hopper and having cells opening axially and radially, a block fixed in the hopper alongside the outlet and closing the lateral opening of a cell when the same stands opposite to the block with its radial opening registering with said outlet, a spring disposed in the corner of said block and serving as a wiper to remove surplus seeds as the disk is turned to bring a cell opposite the block, and manually operable means for so turning the disk when desired.

4. In a device of the class described, the combination with a hopper, and a partition therein dividing the same into seed and disk compartments, the bottom of the hopper having an opening from the disk compartment and the partition having a seed passage through it forward of said opening; of a disk pivotally mounted within the disk compartment, the disk having cells offset from the plane of its body and opening axially toward the partition to aline with its passage and radially to aline with said opening, and manually operable means for turning the disk to move a cell past said passage and bring it to rest opposite said opening when desired.

5. In a device of the class described, the combination with a hopper, and a partition therein dividing the same into seed and disk compartments, the bottom of the hopper having an opening from the disk compartment and the partition having a seed passage through it forward of said opening; of a disk pivotally mounted within the disk compartment with one face against said partition, yielding means holding it in contact therewith, the disk having cells offset from the plane of its body and opening axially toward the partition to aline with its passage and radially to aline with said opening, yielding means turning the disk normally in one direction, and manually operable means for turning the disk in the other direction to move a cell past said passage and bring it to rest opposite said opening when desired.

6. In a device of the class described, the combination with a hopper, and a partition therein dividing the same into seed and disk compartments, the bottom of the hopper having an opening from the disk compartment and the partition having a seed passage through it forward of said opening; of a shaft journaled through the hopper, a disk fast thereon within the disk compartment and having cells of different size opening axially toward the partition and radially toward the wall of the hopper, a plate fast on one end of the shaft and having a series of holes around the shaft, shaft-operating means selectively engaged with said holes for turning the disk at will to move a selected cell past said passage and into registry with said opening, yielding means for turning the shaft and disk in the opposite direction, a pin for selective engagement with said holes, and a stop device on the hopper with which said pin contacts at either extreme movement of the disk.

7. In a device of the class described, the combination with a hopper, and a partition therein dividing the same into seed and disk compartments, the bottom of the hopper having an opening from the disk compartment and the partition having a seed passage through it forward of said opening; of a shaft journaled through the hopper, a disk fast thereon within the disk compartment and having cells of different size opening axially toward the partition and radially toward the wall of the hopper, a plate fast on one end of the shaft and having a series of holes around the shaft, shaft-operating means selectively engaged with said holes for turning the disk at will to move a selected cell past said passage and into registry with said opening, yielding means for turning the shaft and disk in the opposite direction, a screw for selective engagement in said holes according to the cell desired, and a U-shaped stop whose legs are attached to the hopper and cross the path of movement of said screw to limit the movement of the disk in either direction.

8. In a seed dropper, the combination with a hopper made up of end plates and an interposed U-shaped wall, and a partition between said plates dividing the hopper into a seed compartment and a disk compartment, the wall having an outlet opening through its bottom from the seed compartment and the partition having a seed passage through it forward of said opening; of a deflector plate in the seed compartment inclined toward said passage, a disk rotatably mounted in said disk compartment in contact with the partition and having a cell opening axially toward the partition and radially toward the hopper, yielding means holding the disk in position with the cell at the forward end of said passage, and manually operable means for turning the disk to move the cell along the passage and bring it to rest opposite said outlet opening, as described.

9. In a seed dropper, the combination with a hopper made up of end plates and an interposed U-shaped wall, and a partition between said plates dividing the hopper into a seed compartment and a disk compartment, the wall having an outlet opening through its bottom from the seed compartment and the partition having a seed passage through it forward of said opening; of a deflector plate in the seed compartment inclined toward said passage, a block in the seed compartment projecting through the passage at the rear end of the plate and standing opposite said outlet opening, a disk rotatably mounted in said disk compartment in contact with the partition and having a cell opening axially toward the partition and radially toward the hopper, yielding means holding the disk in position with the cell at the forward end of said passage, and manually operable means for turning the disk to move the cell along the passage and bring it to rest opposite said block and outlet opening, said block having a wiper across which the cell moves as it reaches its dumping position, as described.

In testimony whereof, I affix my signature, in the presence of two witnesses.

RICHARD F. STIEPER.

Witnesses:
EDWARD HENNINGS,
FRANCIS T. MAHER.